United States Patent

[11] 3,619,582

| [72] | Inventors | Takayoshi Iwamoto<br>Moriguchi-shi;<br>Hiroaki Shiraki, Fuse-shi; Yoshitaka<br>Nishimura, Neyagawa-shi; Takuya Nasu,<br>Hirakata-shi, all of Japan |
| --- | --- | --- |
| [21] | Appl. No. | 731,447 |
| [22] | Filed | May 23, 1968 |
| [45] | Patented | Nov. 9, 1971 |
| [73] | Assignee | Matsushita Electric Industrial Co., Ltd.<br>Osaka, Japan |
| [32] | Priorities | Jan. 31, 1964 |
| [33] | | Japan |
| [31] | | 39/5124;<br>Jan. 31, 1964, Japan, No. 39/5125<br>Continuation of application Ser. No.<br>429,259, Feb. 1, 1965, now abandoned. |

[54] NUMERICAL CONTROL PULSE DISTRIBUTION METHODS
11 Claims, 19 Drawing Figs.

[52] U.S. Cl. .................................................. 235/152,
235/151.1, 235/151.11

[51] Int. Cl. ....................................................G06f 15/46,
G06g 7/28
[50] Field of Search.......................................... 235/152,
151.1, 151.11; 318/20.130

[56] References Cited
UNITED STATES PATENTS
| 2,886,243 | 5/1959 | Sprague et al. ................ | 235/197 |
| 3,099,781 | 7/1963 | Herchenroeder ............ | 235/151.11 X |
| 3,325,630 | 6/1967 | Murakami ................... | 235/151.11 X |

*Primary Examiner*—Malcolm A. Morrison
*Assistant Examiner*—James F. Gottman
*Attorney*—Stevens, Davis, Miller & Mosher ABSTRACT: In a line tracing apparatus under the control of pulses distributed in at least one of the $X$ and $Y$ directions, a digital control pulse distribution method in which several possible points are imagined for transfer from a reference point. These points are compared with each other to discriminate the most approximate point among them. The next succeeding pulse is distributed based on the result of the discrimination.

NUMERICAL CONTROL PULSE DISTRIBUTION METHODS

CROSS-REFERENCE TO RELATED APPLICATION

This is a continuation application of Application Ser. No. 429,259 filed on Feb. 1, 1965, and now abandoned.

BACKGROUND OF THE INVENTION

This invention relates to digital control of machine tools and the like, and more particularly to methods and systems for having objects under control trace approximate loci of straight or curved lines, by use of electric pulse signals formed of unit linear increments parallel to the X— or Y— axis (two reference axes on a plane), forming outlines of work pieces.

Pulses may be distributed in one axial direction at a time or in both axial directions simultaneously.

SUMMARY OF THE INVENTION

The primary object of the present invention is to provide a method for obtaining an approximate locus with errors far smaller than those of approximate locus obtained by known pulse distribution systems.

Another object of the present invention is to provide a method by which the hardware and computing process of computing machines employed therefor are actually simplified.

Apparatus to perform the above specified inventive methods will be apparent as the description proceeds, with the aids of known techniques well known to those skilled in the art, for example, "Mathematical Methods for Digital Computers" by Ralston & Wilf.

DESCRIPTION OF THE PREFERRED EMBODIMENT

Figure 1:
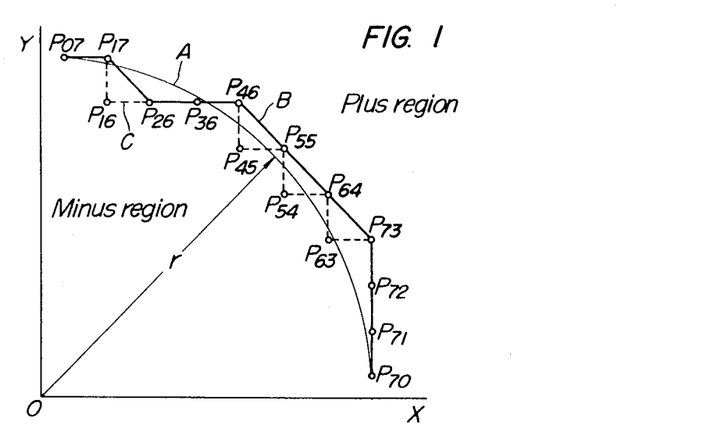
FIGS. 1 and 2 show curve (including straight line) tracing methods according to conventional pulse distribution systems.
Figure 2:
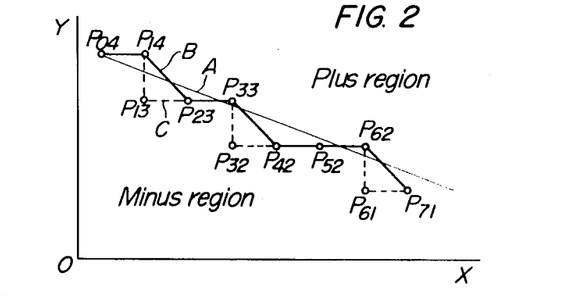

Referring now to the drawings, FIGS. 1 and 2 show respective examples of curved and straight lines to be traced by a conventional pulse distribution system which will be explained below.

In order to effect pulse distribution so as to trace the circular arc A shown in FIG. 1 from point $P_{07}$ to point $P_{70}$, point $P_{07}$ is taken as the beginning point of the pulse distribution, and one pulse of say the X-axis direction is distributed thereto. Then the coordinates of point $P_{17}$ which is shifted from point $P_{07}$ in X-axis direction are detected to discriminate whether point $P_{17}$ is in the plus or minus region of arc A. If point $P_{17}$ is in the plus region, one pulse is distributed in the minus direction of the Y-axis as shown by a locus $\overline{P_{17}P_{16}}$. Next, the coordinates of point $P_{16}$ are detected and so on as the method is repeated. If the coordinates of $P_{16}$, for example, are in the minus region, as in FIG. 1, one pulse is distributed in the X-axis direction. Similar procedures are taken successively and the coordinates of the last point of each shift are discriminated whether the point is in the plus or minus region. Based on the result of such discriminations, an approximate locus C ($P_{07}$-$P_{17}$-$P_{16}$-$P_{26}$-$P_{36}$-$P_{46}$-$P_{45}$.......$P_{70}$) of arc A can be obtained.

Further, in order to obtain a more smooth locus, or in order to modify the rectangular locus C to obtain a locus such as B ($P_{07}$-$P_{17}$-$P_{26}$-$P_{36}$-$P_{46}$-$P_{55}$.......$P_{70}$), another pulse distribution means is added, which delays the pulse in the direction of one axis, either the X-axis or Y-axis (Y-axis in the cases of FIGS. 1 and 2), by a time period corresponding to one-pulse interval, whereby a relatively smooth approximate locus is obtained. In FIG. 2, similar procedures are applied to a trace of the straight line A for obtaining an approximate locus B. The conventional method as explained above, however, cannot necessarily effect pulse distribution so as to provide the best approximate loci corresponding to curved or straight lines being traced, but has an inevitable approximate error up to ±1 pulse.

The present invention has been completed, taking the above-described fact into consideration, and possible embodiments thereof may be represented by the following four methods:

1. Minimum-distance, five-point comparison method;
2. Minimum-distance, three-point comparison method;
3. Three distances in one direction comparison method; and
4. Five distances in one direction comparison method.

The respective methods have features to be described hereinafter, and any one of them may selectively be employed appropriately for a particular purpose.

1. Minimum-distance five point comparison method.

This method accumulates pulses, starting from the initial point, distributed simultaneously in both X- and Y-axis directions or in either one direction, and compare minimum distances from five possible points to which the point may move by the next pulse distribution to the straight or curved line being traced to discriminate the smallest distance among the minimum distances to determine the next pulse distribution. Based on the results of such discrimination, pulses are distributed in both the X-axis and the Y-axis directions simultaneously or in either one of them separately, whereby the most satisfactory and smooth, approximate locus is drawn.

According to this method, a composite pulse consisting of one pulse in the X-axis direction and one pulse in the Y-axis direction, or a simple pulse in either the X or Y axis direction, will be distributed at a time. The point which is to be accumulated by the next discrimination is one of five imaginary grating points surrounding the end point of the preceding shift. The discrimination is performed by comparing five minimum distances from the five imaginary points to the line to be traced and selecting the one point which is closest to the line. Pulses are distributed according to the above-described discrimination to thereby obtain the preferable and smoothest approximate locus for the line to be traced.

Figure 3:
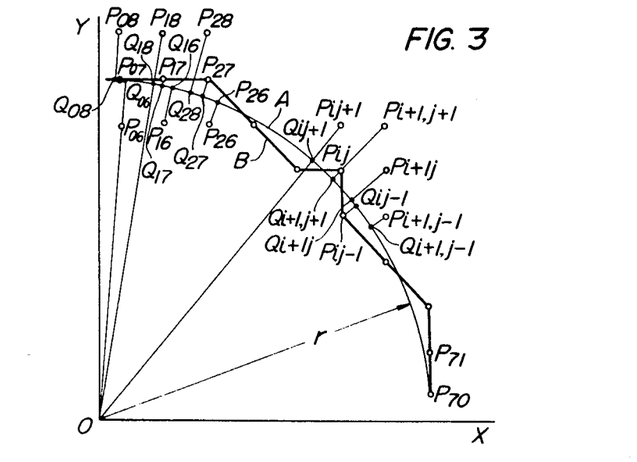
FIGS. 3 and 4 show curve tracing methods according to the present invention in which minimum-distances from five point to the line to be traced are compared.
Figure 4:
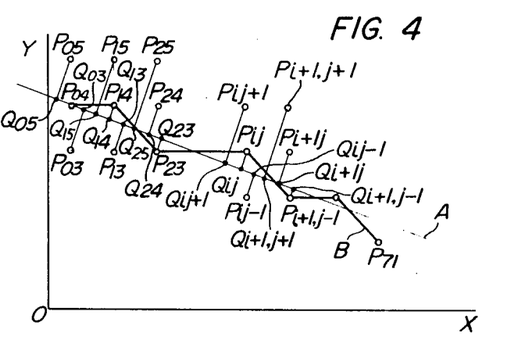

Referring to FIGS. 3 and 4, loci B are examples of approximate loci of a circular arc and a straight line, respectively, obtained by this pulse distribution method, and show a better approximation than loci B in FIGS. 1 and 2, respectively.

Referring to FIG. 3, a circular arc A is traced from point $P_{07}$ to point $P_{70}$. Taking the beginning point $P_{07}$ as the reference, and then taking five imaginary points $P_{08}$, $P_{18}$, $P_{17}$, $P_{16}$ and $P_{06}$ as possible points to be traced by the next pulse distribution in both the X-axis and the Y-axis directions, or in either one of them alone, the minimum distances from these points to the circular arc A, $\overline{P_{08}Q_{08}}$, $\overline{P_{18}Q_{18}}$, $\overline{P_{17}Q_{17}}$, $\overline{P_{16}Q_{16}}$ and $\overline{P_{06}Q_{06}}$ are sought. Next, the imaginary point of the minimum among these values is discriminated, and pulse distribution is effected so as to draw the locus to such an imaginary point. In the case of FIG. 3, the relation of the distances is $\overline{P_{17}Q_{17}} < \overline{P_{16}Q_{16}} < \overline{P_{06}Q_{06}} < \overline{P_{08}Q_{08}} < \overline{P_{18}Q_{18}}$. Thus, point $P_{17}$ is the best approximation, and therefore, one pulse is distributed in the X-axis direction. If there should exist an imaginary point that could not be defined, such as $Q_{03}$ corresponding to $P_{08}$, such an imaginary point would be omitted. Next, taking point $P_{17}$ as the reference, similar pulse distribution is effected to obtain the best point $P_{27}$, and one pulse is distributed in X-axis direction.

In general, in order to effect pulse distribution, taking point $P_{i,j}$ as the reference, five points having potential to be accumulated or to be traced by the next pulse distribution, $P_{i,j+1}$, $P_{i+1,j+}$, $P_{i+1,j}$, $P_{i+1,j11}$ and $P_{i,j11}$, are imagined, and the minimum distances from these five points to the arc A, $\overline{P_{i,j+1}Q_{i,j+1}}$, $\overline{P_{i+1,j+}Q_{i+1,j+1}}$, $\overline{P_{i+1,j}Q_{i+1,j}}$, $\overline{P_{i+1,j11}Q_{i+1,j11}}$ and $\overline{P_{i,j11}Q_{i,j11}}$ are sought. Then, the imaginary point of the minimum value among the five minimum distances is discriminated and a pulse distribution is effected to draw locus to such discriminated imaginary point. Thus, the best approximate locus B can be obtained. When the unit length of transfer or shift due to a pulse distribution is extremely small in comparison to the radius of curvature of the curve to be traced, as in the case of numerical controls of ordinary machine tools, the approximate error can be limited to within ±½pulse.

FIG. 4 shows another example of said method as applied to a straight line wherein a better locus B is obtained than the locus B in FIG. 2.

With regard to pulse distribution, when one pulse is distributed in each of the X-axis and Y-axis directions simultaneously, and when the unit length of transfer for one pulse is equal in the X-axis and the Y-axis directions, as in the cases of FIGS. 3 and 4, the locus is at an inclination of 45 degrees with respect to the X-axis and the amount of transfer is 2 times that for a pulse distribution in one axis direction only.

Further, according to this method, in the case of FIG. 3, for example, after the curve tracing direction is determined, a pulse is distributed always in the plus direction with regard to the X-axis direction, but with regard to the Y-axis direction, a pulse is distributed in either the plus or minus direction. Consequently, even when the curve has concavities and convexities, pulse distribution can be effected according to this method as shown in FIGS. 1 and 2, the curve should be divided into sections of positive inclination and of negative inclination.

The present method is not limited to two-dimensional pulse distribution, but may broadly be applied to three-dimensional pulse distribution also.

When a circular arc is traced for example, the present method may be brought into practice in the manner to be described hereinafter.

The coordinates $(x_i, y_j)$ of point $P_{i,j}$, when the point having initial values $x_0$ and $y_0$ has been transferred in the X-axis and the Y-axis directions, respectively, by $i$ and $j$ steps, are $$x_i = x_0 + i\Delta x$$
$$y_j = y_0 + j\Delta y$$

wherein $\Delta y$ and $\Delta x$ are unit transfer distances in the X-axis and Y-axis directions, respectively. The minimum distance from point $P_{i,j}$ to the circular arc A of a radius $r$ having its center of origin as shown in FIG. 3, is given by $$d = \left| \sqrt{x_i^2 + y_j^2} - r \right| \quad (1)$$

The minimum distances to arc A from the five points $P_{i,j+1}$, $P_{i+1,j+}$, $P_{i+1,j}$, $P_{i+1,j11}$ and $P_{i,j11}$, which are imagined for the next transfer from the reference point $P_{i,j}$ are then sought, and among them, pulse distributions effected so as to draw a locus to the point of minimum distance value. Similar operations are repeated thereafter.

Figure 5:
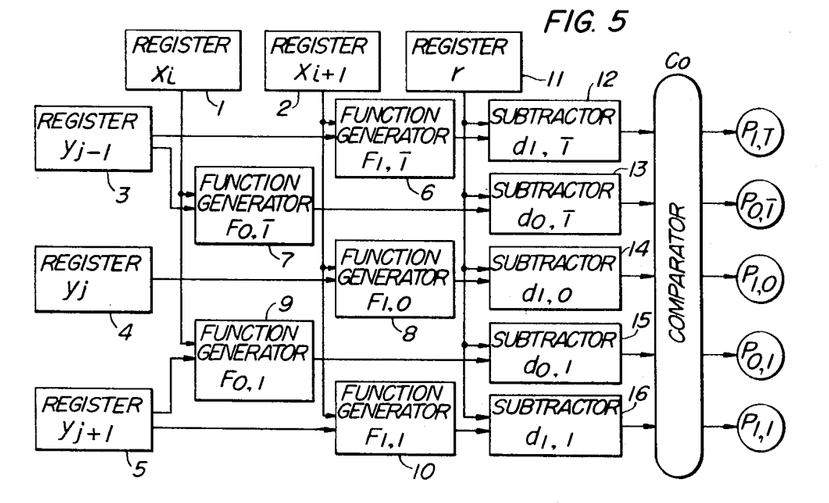
FIG. 5 is a block diagram showing one example of a pulse distributor to be used in the minimum-distance, five point comparing method.
Figure 6:
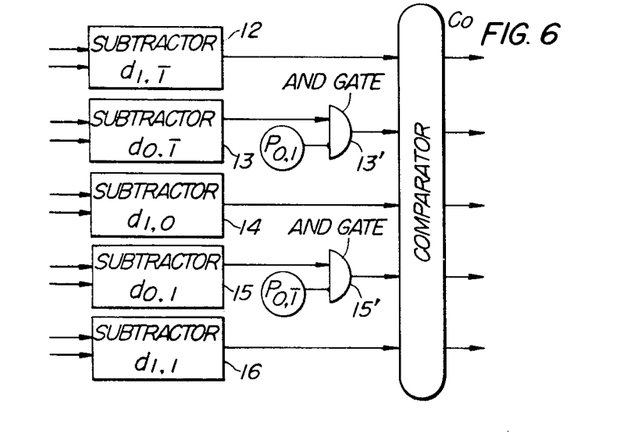
FIG. 6 is a block diagram for explaining the input to the comparator shown in FIG. 5.

FIG. 5 is a block diagram showing one example of an arrangement for bringing the above method into practice. In FIG. 5, 1 and 2 are registers for storing values of $x_i$ and $x_{i+1}$, respectively; 3, 4 and 5 are registers for storing values of $y_{j11}$, $y_j$ and $y_{j+1}$, respectively; and 6 through 10 function generators for computing the values of $\sqrt{x^2 + y^2}$ with respect to two inputs $x$ and $y$. The differences between the values of $\sqrt{x^2 + y^2}$ thus computed and the radius $r$ of the arc A are given by subtractors 12 to 16, and these difference values are compared with by a comparator Co for selecting the minimum value. A distribution pulse corresponding thereto is generated as $P_{1,\bar{1}}$, $P_{0,\bar{1}}$, $P_{1,0}$, $P_{0,1}$, or $P_{1,1}$. Here, $P_{1,\bar{1}}$, $P_{0,\bar{1}}$, etc., signify distribution pulses for drawing a locus from point $P_{i,j}$ to points $P_{i+1,j11}$, $P_{i,j11}$, etc. respectively. In this case, if the distribution pulse of the preceding step is $P_{0,\bar{1}}$, $d_{0,1}$, the signal from the subtractor 15, is blocked by this distribution pulse $P_{0,\bar{1}}$, as shown in FIG. 6, so that the comparator circuit Co is prevented from participating in a reverse direction (backward direction) with respect to the direction of transfer of the preceding steps. Similarly, distribution pulse $P_{0,1}$ blocks $d_{0,\bar{1}}$, the signal from the subtractor 13 for the next step. Thus only when distribution pulses other than these two pulses, $P_{0,\bar{1}}$ and $P_{0,1}$, are generated, the comparison and discrimination in the five directions are effected in the next step.

Figure 7A:
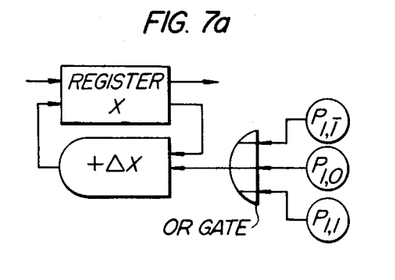
FIGS. 7a and 7b show the X-register and Y-register, respectively, shown in FIG.
Figure 7B:
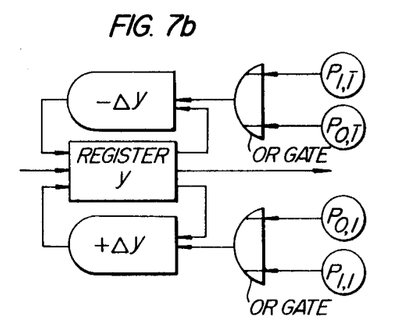

After the pulse distribution is finished, transfer to the next step may be effected by the arrangement shown in FIGS. 7a and 7b, for example. When the pulse $P_{1,\bar{1}}$ is distributed, this distribution of the pulse $P_{1,\bar{1}}$ acts to increase the value in the $x$ register by an increment $\Delta x$, as shown in FIG. 7a. At the same time, the value in the $y$ register is decreased by a decrement $\Delta y$, as shown in FIG. 7b, to prepare for the next step operation. Similarly, distribution of the pulse $P_{0,1}$ increases the value in the $y$ register by an increment $\Delta y$ to prepare for the next step.

The function generators 6 to 10 in FIG. 5 operate to determine the value of $\sqrt{x^2 + y^2}$ with respect to a point $P(x,y)$, and this calculation is effected, for example, by Newton's successive approximation method, the value being sought as described below.

Set $x^2 + y^2 = A$, and let the first approximate value of $\sqrt{A}$ be $A'$. By calculation of $\frac{1}{2}(A/A' + A')$ a second approximate value $A''$ for $\sqrt{A}$ having smaller error is obtained. By repeating such operations with a digital computer an approximate value of $\sqrt{A}$ of higher accuracy can readily be calculated. As the value of the first approximation $A'$, the radius $r$ of the circle may conveniently be selected.

Figure 8:
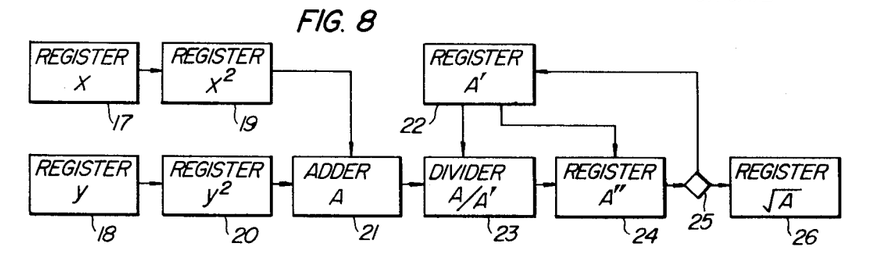
FIG. 8 is a block diagram showing an example of a function generator.

FIG. 8 is a block diagram of a function generator for providing the value of $\sqrt{x^2 + y^2}$ by the above-described method. In FIG 8, 17 and 18 are registers for storing the coordinate values of $x$ and $y$, respectively, and 19 and 20 are registers for calculating the squares of these values, respectively. The value of $x^2 + y^2$ or A is computed in an adder 21. On the other hand, the radius $r$ of the circle preliminarily stored in the register 22 as an approximation of $\sqrt{A}$ acts on a divider 23 to provide the value $A/r$. Then $A'' \frac{1}{2}(r = A/r)$ is provided in a register 24 which calculates the arithmetic means of the two inputs, increasing the degree of accuracy. Such computing operations of $22 \to 23 \to 24$ are repeated a suitable number of times as determined at 25. After the degree of accuracy has been raised sufficiently, the output value of the register 24 is then extracted at 25 as the final approximation of $\sqrt{A}$ and then it is transferred to and stored in a register 26.

Tracing of a straight line may also be explained in a similar manner. If the equation of the straight line to be traced is $$ax + by + c = 0,$$

then the minimum distance $d$ from an arbitrary point $P_{i,j}(X_i, Y_j)$ to the above mentioned straight line is given by $$d = \frac{|ax_i + by_j + c|}{\sqrt{a^2 + b^2}} \quad (2)$$

The term $a^2+b^2$ is of a constant value, provided that the straight line to be traced is determined. Therefore the numerator of equation (2), $$d^* = ax_i + by_j + c \quad (3)$$

may be utilized for comparison of minimum distances from the five imaginary points to the straight line being traced. In this case, the function generators 6 to 10 in FIG. 5 are modified to correspond to equation (3), with register 11 being omitted.

The present method as above explained may be applied to spherical surfaces or planes as well as circles or straight lines by the following equations in lieu of equations (1) and (3), respectively:

$$d = |\sqrt{x^2+y^2+z^2} - r|$$
$$d^* = |ax_i + by_j + cz_k + d|$$

Thus the present method may be expanded to three dimensional operations. 2. Minimum-distance, three-point comparison method.

Figure 9:
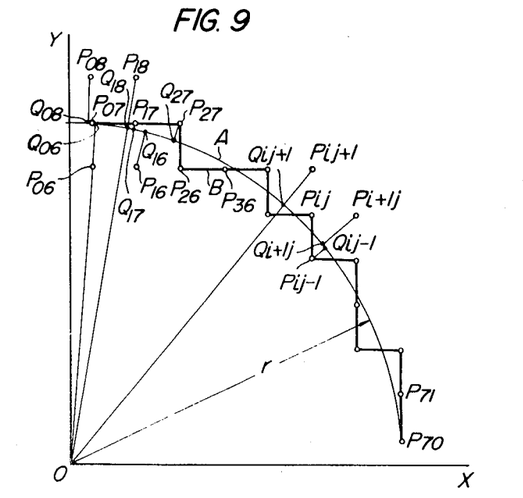
FIGS. 9 and 10 show a curve tracing method according to the present invention in which minimum-distances from three points to a curve to be traced are compared.
Figure 10:
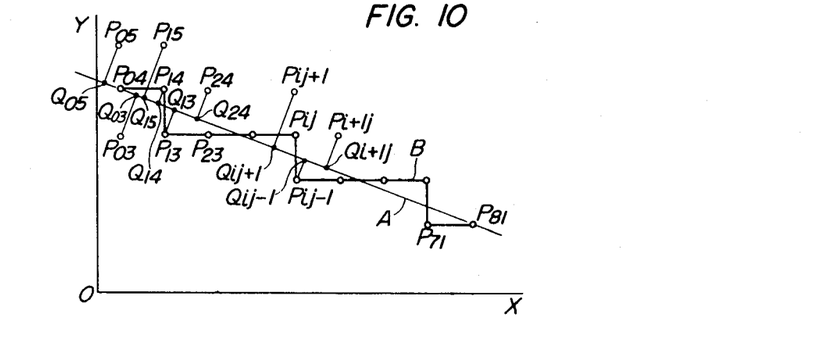

In order to simplify the computing process as well as the design or a computing machine or the construction of hardware, the imaginary points may be limited to three, instead of five, say $P_{i,j+1}$, $P_{i+1,j}$ and $P_{i,j11}$ for a reference point $P_{i,j}$ in FIGS. 3 and 4, for effecting the comparison and discrimination. FIGS. 9 and 10 show the approximate loci B for a circular arc and a straight line obtained by this method of pulse distribution. In this case, when the unit length of transfer due to pulse distribution is extremely small in comparison with the radius of curvature of the curve being traced, the approximate error or is within $\pm 1/\sqrt{2}$ pulse. This method may be brought into practice with the arrangements shown in FIGS. 5 to 7, with omission of function generators 6 and 10, subtractors 12 and 16, and distribution pulses $P_{1,\bar{1}}$ and $P_{1,1}$. 3. Three distances in one direction comparison method.

Minimum distances of the foregoing methods may be replaced by distances in one direction or functions of the distances for the purpose of comparison and discrimination. However, according to this method, the pulse distribution is effected only in one axis direction at a time, i.e. in the X-axis direction or the Y-axis direction. This method is as effective as the method (2), three imaginary points being taken for the comparison and discrimination for each pulse distribution.

Figure 11:
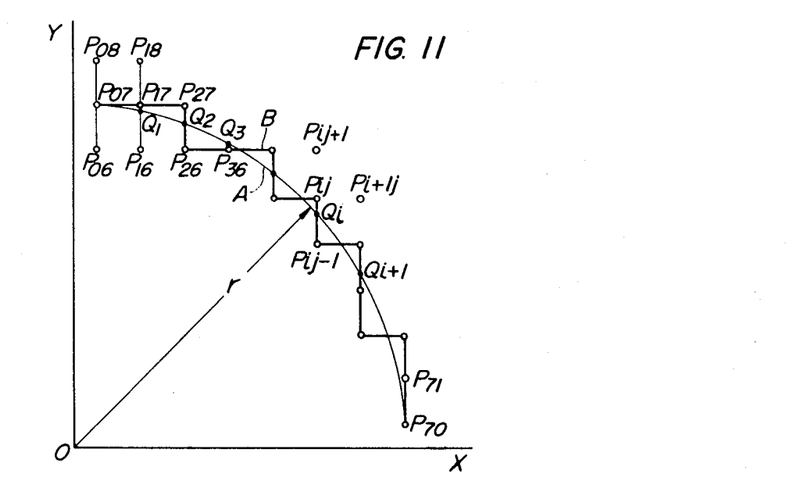
FIGS. 11 and 12 show another curve tracing method according to the invention in which distances from three points to a curve to be traced in one coordinate axis direction or functions of the distances are compared.
Figure 12:
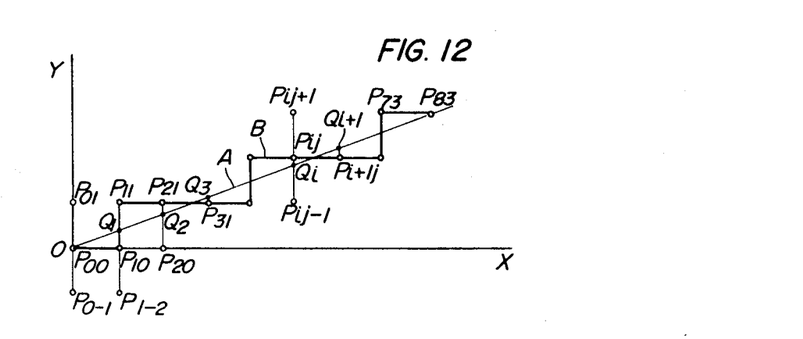

FIGS. 11 and 12 show the approximate loci B of a circular arc and a straight line, respectively, obtained by this method of pulse distribution. Circular arcs and straight lines are considered to be the most basic of lines.

Referring to FIG. 11, for tracing a circular arc A from point $P_{07}$ to point $P_{70}$ by pulse distribution, the beginning point $P_{07}$ is taken as a reference, and three points $P_{17}$, $P_{08}$ and $P_{06}$ are imagined for the next accumulation by the next pulse distribution. The distances from these three points to the arc A in the Y-axis direction, $\overline{P_{17}Q_1}$, $\overline{P_{08}P_{07}}$ and $\overline{P_{06}P_{07}}$, are then compared with each other. In the case of FIG. 11, the relation is
$$\overline{P_{17}Q_1} < \overline{P_{08}P_{07}} = \overline{P_{06}P_{07}}.$$
Thus, in order to obtain a better approximate locus, one pulse is distributed in the X-axis direction to draw the locus $P_{07}P_{17}$. Next, point $P_{17}$ is taken as a reference, and three points $P_{27}$, $P_{18}$ and $P_{16}$ are imagined for accumulation by the next pulse distribution, and distances $\overline{P_{27}Q_2}$, $\overline{P_{18}Q_1}$ and $\overline{P_{16}Q_1}$ are compared with each other. In this example shown, the relation is
$$\overline{P_{27}Q_2} < \overline{P_{16}Q_1} \, \overline{P_{18}Q_1},$$
and, therefore, one pulse is distributed in the X-axis direction.

In general, for effecting pulse distribution with point $P_{i,j}$ as a reference, three points $P_{i+1,j}$, $P_{i,j+1}$ and $P_{i,j11}$ are imagined for accumulation by the next pulse distribution. The distances from these points to the arc A in the Y-axis direction, $\overline{P_{i+1,j}Q_{i+1}}$, $\overline{P_{i,j+1}Q_i}$ and $\overline{P_{i,j11}Q_i}$ are compared with each other for discrimination of the least value of them. A pulse is then distributed in the X- or Y-axis direction for drawing a locus to the point of the least value. Similar operations are repeated for successive pulse distributions, and an approximate locus B for the arc A is obtained. The approximation error due to pulse distribution is within $\pm 1/\sqrt{2}$ pulse under the aforementioned conditions.

FIG. 12 shows an application of this method to a straight line. In this case also, a similar pulse distribution is effected as in the case of FIG. 11.

The initial point $P_{00}$ is taken as the reference, and three points $P_{10}$, $P_{01}$ and $P_{01}$ are imagined for accumulation by the next pulse distribution. The distances from these points to the straight line A in the Y-axis direction, $\overline{P_{10}Q_1}$, $\overline{P_{01}P_{00}}$ and $\overline{P_{01}P_{00}}$ are then compared with each other. In this case, the relation is
$$\overline{P_{10}Q_1} \, P_{01}P_{00} = P_{01}P_{00},$$
and consequently, one pulse is distributed in the X-axis direction. Similar operations are repeated and an approximate locus B is obtained.

Figure 13:
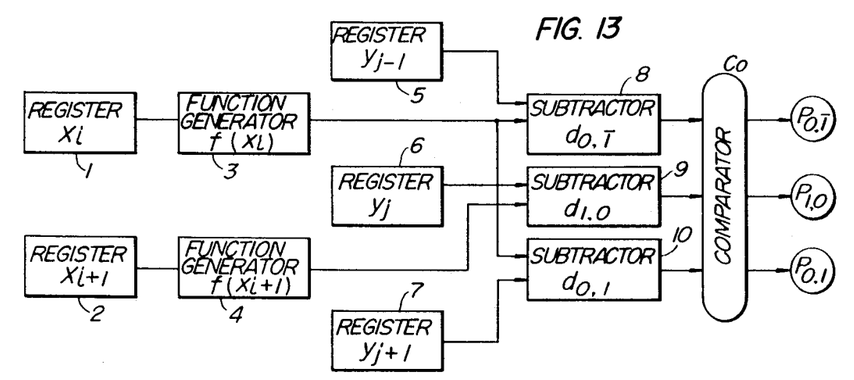
FIG. 13 is a block diagram showing one example of a pulse distributor to be used for comparing method of FIGS. 11 and 12.
Figure 14:
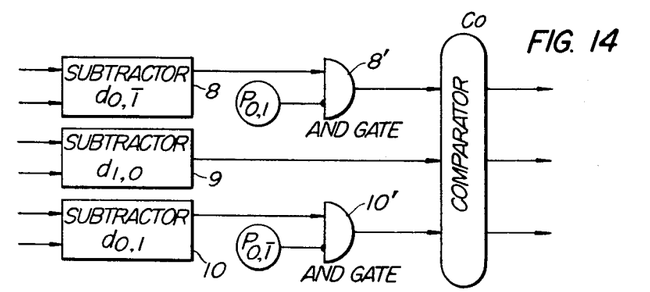
FIG. 14 is a block diagram for explanation of the input to the comparator shown in FIG 13.

This method of pulse distribution may be brought into practice by use of the arrangement shown in FIGS. 13 and 14, for example.

If the coordinates of point $P_{i,j}$, to which the initial point $X_0$, $Y_0$ moves after $i$ and $j$ steps advancement in the X-axis and Y-axis directions, respectively, are expressed by $X_i$ and $Y_j$, the equation of the straight or curved line to be traced is expressed by $y = f(x)$, the Y coordinate of point $P_{i,j}$ is expressed by $[P_{i,j}]$, and the distance to be discriminated is expressed by $d$, a system of this method will distribute one pulse for obtaining a locus towards point P having the least value of $d$ among the following three values:

$$\overline{P_{i+1,j}Q_{i+1}} = |[P_{i+1,j}] - [Q_{i+1}]| = Y_j - f(X_{i+1}) \quad d_{1,0}$$
$$\overline{P_{i,j+1}Q_i} = |[P_{i,j+1}] - [Q_i]| = Y_{j+1} - f(X_i)] \quad d_{0,1}$$
$$\overline{P_{i,j11}Q_i} = |[P_{i,j11}] - [Q_i]| = Y_{j11} - f(X_i) \quad d_{0,1}$$

FIG. 13 is a block diagram of an arrangement for practising this method. In this figure, 1 and 2 are registers for storing values of $X_i$ and $X_{i+1}$, respectively; 3 and 4 are function generators for providing function values $f(x_i)$ and $f(x_{i+1})$ depending on the values of $x_i$ and $x_{i+1}$, respectively; and 5 through 7 are registers for storing values of $Y_{j11}$, $Y_j$ and $Y_{j+1}$, respectively. Subtractors 8 through 10 provide for distances to be discriminated, $d_{0,1}$, $d_{1,0}$ and $d_{0,1}$, respectively. Distances obtained here are entered into a comparator Co for comparison with each other, which provides one distribution pulse, $P_{0,1}$, $P_{1,0}$ or $P_{0,1}$ corresponding to the minimum distance.

If, in this case, the preceding distributed pulse was $P_{0,1}$ or $P_{0,1}$, $d_{0,1}$ or $d_{0,1}$ are blocked thereby, respectively, and the transfer in the reverse direction to the transfer of the preceding step is not participated by comparator circuit Co, as in the cases of the methods (1) and (2). The increasing and decreasing operations of the $x$ and $y$ registers by control pulses $P_{0,1}$, $P_{1,0}$ and $P_{0,1}$ are also effected in a manner similar to the method of FIG. 7.

In the case of tracing a circular arc, for example, function generators 3 and 4 are to provide, for coordinate $x_m$, $$f(x_m) = r_2 - x_m^2$$

where $r$ is the radius of the circle shown in FIG. 11. This calculation can be effected by the Newton's method as shown in FIG. 8, for example.

This method is not limited to two dimensional operation as above-explained, but can be expanded to three dimensional operation. With regard to the arts of providing a general function, any known art as well as Newton's method, such as expansion into Taylor's series, optimal uniform approximation, Chebyshev's polynomial, or the like, may be resorted to for effecting high accuracy calculation by use of a digital computer. Consequently, this method can broadly be applied to functional curves in general such as parabolas, sine curves, etc., as well as straight lines and circular arcs. Further, according to this ). pulses may be distributed in either the positive or negative Y-axis direction and pulses can be distributed without dividing a curve to be traced into increasing and decreasing sections, even when the curve has upward concavities and convexities, just as in the methods (1) and (2). (4) Five distances in one direction comparison method.

Figure 15:
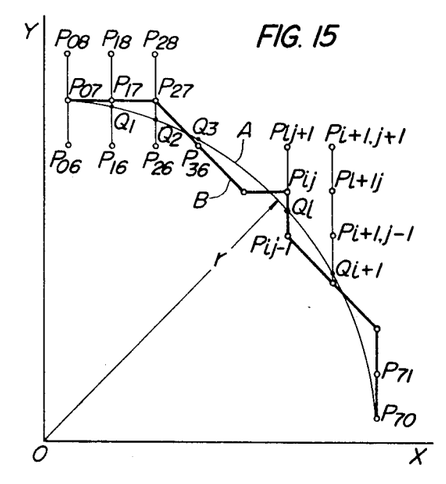
FIGS. 15 and 16 show a curve tracing method according to the present invention in which distances from five points to a curve to be traced in one coordinate axis direction of functions of the distances are compared.
Figure 16:
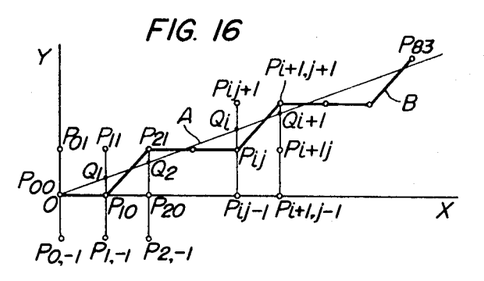
Figure 17:
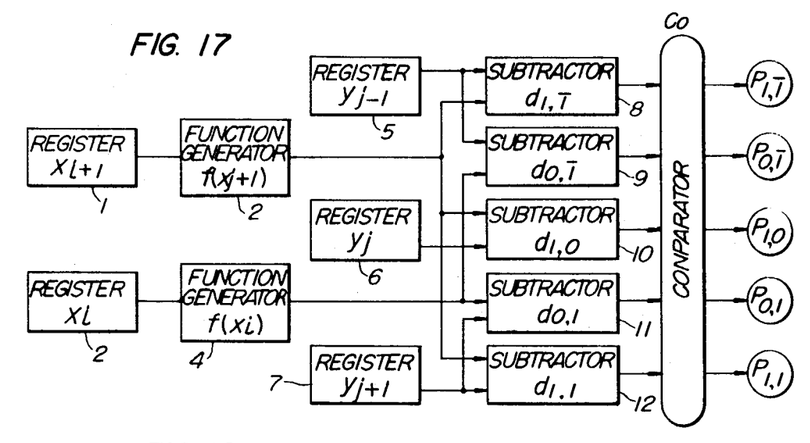
FIG. 17 is a block diagram showing one example of a pulse distributor to be used for the comparing method of FIGS. 15 and 16.
Figure 18:
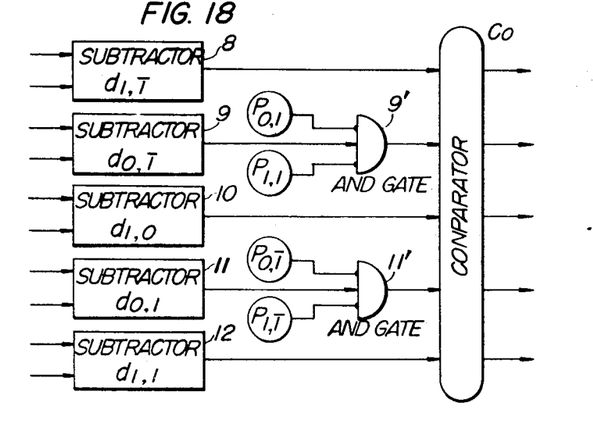
FIG. 18 is a block diagram for explanation of the input to the comparator shown in FIG. 17.

In the method (3), three imaginary points are employed for the comparison and discrimination with function values, but in order to increase the degree of accuracy of the approximation, five imaginary points may be employed. FIGS. 15 and 16 shown approximate loci B of a circular arc and a straight line, respectively, obtained by this method of pulse distribution, while FIGS. 17 and 18 are block diagrams of an arrangement for carrying out this method. The approximation error in this method under the aforementioned conditions is within ± one-half pulse, as in the case of method (1).

1. In a tracing apparatus controlled by pulses delivered in at least one of the directions of the X and Y axes, a numerically controlled pulse distributing method comprising calculating by means of registers, function generators and subtractors the degree of approximation between the respective distances from a plurality of imaginary points to a line which is to be traced, said imaginary points being possible points to which an object may move when one pulse is delivered and advanced at least one step in one of the axial directions of X and Y, and comparing and judging by means of a comparator said degree of approximation for each of the imaginary points to supply a pulse to move said object to the point which is the most approximate of all said imaginary points on the basis of said judgment.

2. A numerically controlled pulse distributing method according to claim 1, wherein said distances are distances in one of the directions of the X and Y axes between said plurality of imaginary points and said line to be traced.

A numerically controlled pulse distributing method according to claim 1, wherein said distances are the shortest distances between said plurality of imaginary points and the line to be traced.

4. A numerically controlled pulse distributing method according to claim 1 for tracing a circular arc, wherein said step of calculating the degree of approximation comprises storing signals $x_i$, $x_{i+1}$, $y_{j11}$, $y_j$, $y_{j+1}$, and the radius of said arc, $r$, in said registers, respectively, providing by said function generators $x^2+y^2$ for two inputs ($x$ and $y$), by providing by subtractors the differences between the function values generated by said function generators and said radius ($r$), and said step of comparing and judging comprises comparing by said comparator the calculated values provided by said subtractors with each other for discriminating the point of the most approximate function value, for approximating an appropriate pulse.

5. A numerically controlled pulse distributing method according to claim 3 for tracing a circular arc, wherein said step of calculating the degree of approximation comprises storing signals $x_i$, $x_{i+1}$, $y_{j11}$, $y_j$, $y_{j+1}$, and the radius of said arc, $r$, in said registers, respectively, providing by said function generators $x^2+y^2$ for two inputs ($x$ and $y$), providing by subtractors the differences between the function values generated by said function generators and said radius ($r$), and said step of comparing and judging comprises comparing by said comparator the calculated values provided by said subtractors with each other for discriminating the point of the most approximate function value, for approximating an appropriate pulse.

6. A numerically controlled pulse distributing method according to claim 1, wherein said step of calculating the degree of approximation comprises storing signals $x_i$, $x_{i+1}$, $y_{j11}$, $y_j$, and $y_{j+1}$ in said registers, respectively, providing by said function generators function values $f(x_i)$ and $f(x_{i+1})$ of said values $x_i$ and $x_{i+1}$, respectively, providing by said subtractors the differences between the function values and the stored values of $y$, and said step of comparing and judging comprises comparing by said comparator the calculated values providing by said subtractors with each other for discriminating the point of the most approximate function value, for generating an appropriate pulse.

7. A numerically controlled pulse distributing method according to claim 1, wherein said step of calculating the degree of approximation comprises inhibiting by AND gates the calculation of values which have been obtained previously, whereby pulse distribution in the reverse direction is inhibited.

8. A numerically controlled pulse distributing method according to claim 2, wherein said step of calculating the degree of approximation comprises storing signals $x_i$, $x_{i+1}$, $y_{j11}$, $y_j$, and $y_{j+1}$ in said registers, respectively, providing by said function generators function values of $f(x_i)$ and $f(x_{i+1})$ of said values $x_i$ and $x_{i+1}$, respectively, providing by said subtractors the difference between the function values and the stored values of $y$, and said step of comparing and judging comprises comparing by said comparator the calculated values provided by said subtractors with each other discriminating the point of the most approximate function value, for generating an appropriate pulse.

9. A numerically controlled pulse distributing method according to claim 2, wherein said step of calculating degree of approximation comprises inhibiting by AND gates the calculation of values which have been obtained previously, whereby pulse distribution in the reverse direction is inhibited.

10. A numerically controlled pulse distributing method according to claim 2, wherein said step of calculating the degree of approximation comprises storing signals $x_i$, $x_{i+1}$, $y_{j11}$, $y_j$, and $y_{j+1}$ in said registers, respectively, providing by said function generators function values $f(x_i)$ and $f(x_{i+1})$ of said values $x_i$ and $x_{i+1}$, respectively, providing by said subtractors the differences between the function values and the stored values of $y$, and said step of comparing and judging comprises comparing by said comparator the calculated values provided by said subtractors with each other for discriminating the point of the most approximate function value, for generating an appropriate pulse.

11. A numerically controlled pulse distributing method according to claim 3, wherein said step of calculating the degree of approximation comprises inhibiting by AND gates the calculation of values which have bee obtained previously, whereby pulse distribution in the reverse direction is inhibited.

* * * * *